Nov. 20, 1956   J. HANDLEY   2,771,264
PIT PROP

Filed March 31, 1953   2 Sheets-Sheet 1

Inventor
John Handley
by
Pennie, Edmonds, Morton, Barrows and Taylor
Attorneys

Nov. 20, 1956   J. HANDLEY   2,771,264
PIT PROP

Filed March 31, 1953   2 Sheets-Sheet 2

Inventor
John Handley
by Pennie, Edmonds, Morton, Barrows and Taylor
Attorneys

United States Patent Office 2,771,264
Patented Nov. 20, 1956

2,771,264
PIT PROP

John Handley, Little Marland, Briar Hill, Purley, England, assignor of one-half to Jack Nixon Browne, London, England Application March 31, 1953, Serial No. 345,937

Claims priority, application Great Britain April 2, 1952

2 Claims. (Cl. 248—356)

This invention relates to improvements in mechanical props for use in coal mines.

The primary object of the invention is to provide a mechanical prop which is readily adjustable and easily installed.

A further object of the invention is to provide a mechanical prop for use in coal mines which is adapted to carry a predetermined load and which is responsive to an overload.

The invention consists broadly in tthe use of a screw having a quick lead that will run down unless prevented from turning by some form of braking, for which purpose a divided nut is used with clamping means for clamping it tightly, so that the nut will not yield until the prop is carrying the predetermined load.

Figure 1:
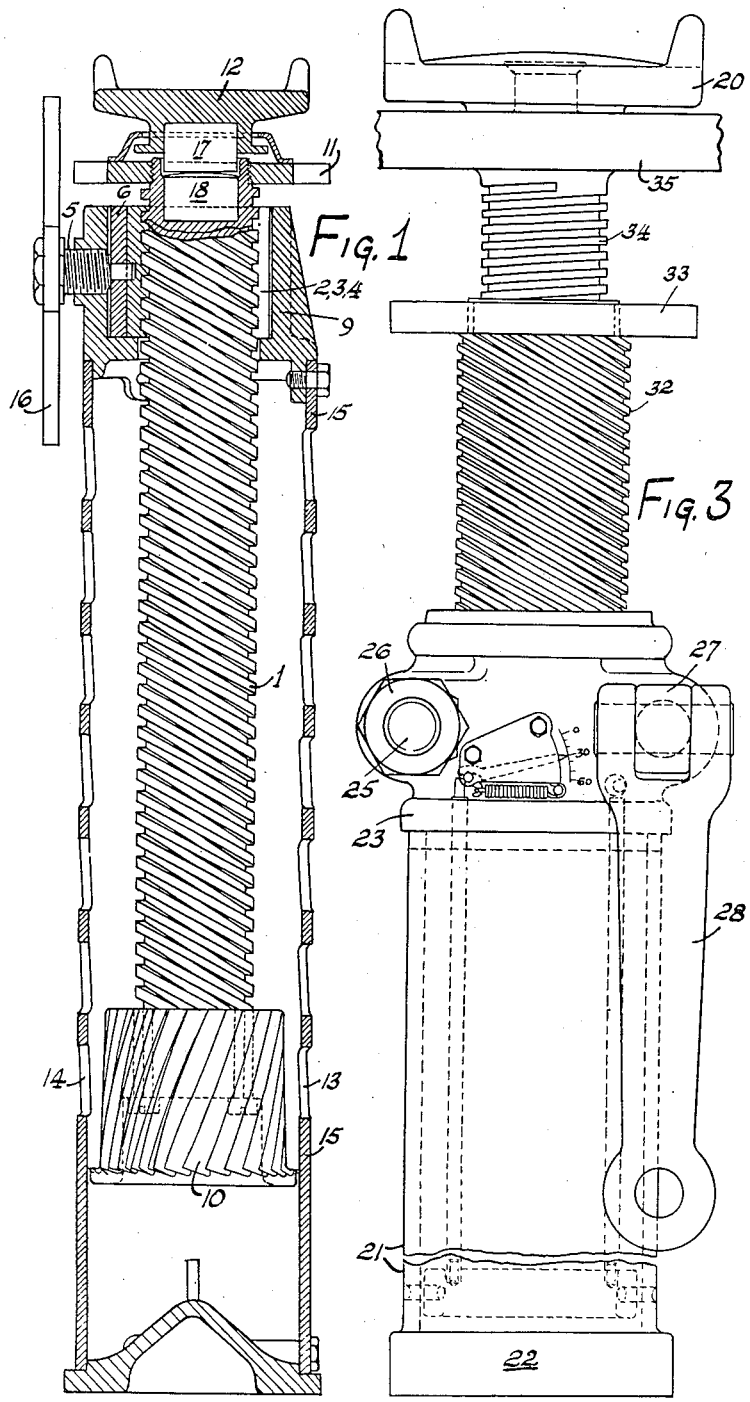
Figure 2:
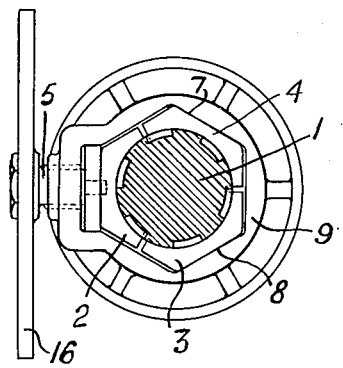

The invention is illustrated in the accompanying drawings in which Fig. 1 is a vertical section of a prop having a single screw, and a ratchet wheel for applying the initial load, and Fig. 2 is a plan view of the same prop with the head removed and the screw shown in section.

Figure 4:
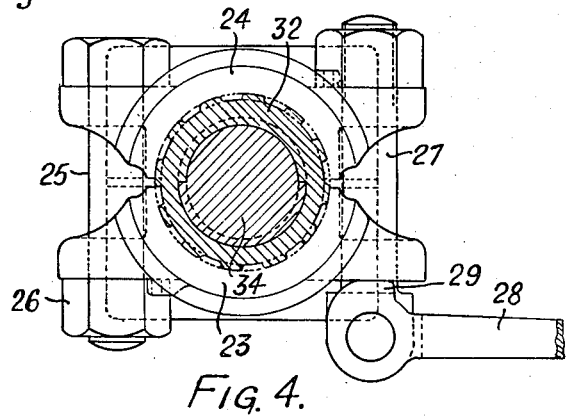

Fig. 3 is a side elevation of a modified prop with two screws, one inside the other, and Fig. 4 is a plan view of the same prop with the head removed and both screws shown in section.

Referring to Figs. 1 and 2 of the drawings, 1 is a yielding screw which rotates in a three part nut including segments 2, 3 and 4. The nut is clamped by a screw 5 and plate 6 against faces 7 and 8 of a housing 9. A ratchet wheel 10 is fixed to the lower end of the screw 1 and may, for cheapness of manufacture, be "cast on" the screw.

The screw 1 may be screwed up to a ceiling by rotating a star plate 11 until a head 12 is touching the ceiling, or a roof bar, when crow bars may be inserted through apertures 13 and 14 in the column 15. The ratchet wheel 10 may be then levered round by the crow bars, lifting the screw 1 until the required initial load is obtained, when a lever 16 may be turned to close the nut and grip the screw 1.

Hardened steel pivots 17 and 18 are provided to reduce friction against the head 12 to a minimum. The teeth of the ratchet wheel 10 and the apertures 13 and 14 are formed at an angle so that the thrust on the crow bars is in the same direction as the wheel 10 is moving, that is round and up at the same time.

Referring to the modification shown in Figs. 3 and 4, a yielding screw 32 may be clamped by means of a lever 28 which is hammered down until it is vertical to close the halves 23, 24 of a nut  To alter the clamping pressure a bolt 25 and nut 26 may be adjusted. To release the clamping pressure the lever 28 is pulled outwards, so that cams 29 on the end of the lever 28 take the load off the eye bolt 27.

The prop may be extended by rotating a star plate 33. 21 denotes the column and 22 the foot thereof.

When the prop is placed in position to support a ceiling an inner screw 34 is turned by wings 35 to apply the initial load, and driven round by hammering, a top plate 20 remaining stationary.

The screws 32 and 34 are left hand and right hand, respectively, so the screw 32 turns whilst the prop is yielding, allowing the inner screw 34 to sink without rotating.

What is claimed is:

1. A telscopic pit prop including a hollow column presenting a base, a segmental contractile nut member carried by said column, a hollow screw-threaded spindle extending within said column and provided externally with screw threads of one hand and internally with screw threads of opposite hand and of different pitch, the external screw threads of the spindle engaging said contractile nut member, adjustable clamping means mounted on said nut member for clamping the nut member with adjustable pressure about the screw-threaded spindle whereby to permit the screw-threaded spindle to yield when the prop is subjected to overload, a second screw-threaded spindle projecting above and engaging with the internal schew thread of the first screw-threaded spindle, and a ceiling-engaging head mounted on the upper end of said second screw-threaded spindle.

2. A telescopic pit prop including a hollow column presenting a base, a segmental contractile nut member carried by said column, a hollow screw-threaded spindle extending within said column and provided externally with screw threads of one hand and internally with screw threads of opposite hand and of different pitch, the external screw threads of the spindle engaging said contractile nut member, adjustable clamping means mounted on said nut member for adjustably clamping the nut member with adjustable pressure about the screw-threaded spindle whereby to permit the screw-threaded spindle to rotate within the nut member when the prop is subjected to overload, and a second screw-threaded spindle having a ceiling-engaging head mounted on the upper end thereof, said second spindle extending at its lower end within and engaging with the internal screw threads of the first screw-threaded spindle, whereby on rotation of the first screw-threaded spindle in the nut member on continued subjection to overload, the second screw-threaded spindle is lowered, yielding taking place on both screw-threaded spindles simultaneously.

References Cited in the file of this patent

UNITED STATES PATENTS

| 568,471 | Ball | Sept. 29, 1896 |
| 1,381,663 | Raeder | June 15, 1921 |
| 2,584,015 | Hawes | Jan. 19, 1952 |
| 2,617,620 | Jessop | Nov. 11, 1952 |

FOREIGN PATENTS

| 564,312 | Germany | 1932 |
| 695,899 | Germany | 1940 |
| 213,273 | Switzerland | 1941 |
| 892,043 | France | 1944 |
| 984,716 | France | 1951 |
| 831,386 | Germany | 1952 |